(12) United States Patent
Masuda et al.

(10) Patent No.: US 10,511,945 B2
(45) Date of Patent: Dec. 17, 2019

(54) BICYCLE COMMUNICATION DEVICE AND PAIRING METHOD

(71) Applicant: Shimano Inc., Sakai, Osaka (JP)

(72) Inventors: Takaya Masuda, Osaka (JP); Takafumi Suzuki, Osaka (JP)

(73) Assignee: Shimano Inc., Osaka (JP)

( * ) Notice: Subject to any disclaimer, the term of this patent is extended or adjusted under 35 U.S.C. 154(b) by 59 days.

(21) Appl. No.: 15/703,375

(22) Filed: Sep. 13, 2017

(65) Prior Publication Data
US 2018/0115860 A1    Apr. 26, 2018

(30) Foreign Application Priority Data

Oct. 26, 2016  (JP) ................. 2016-209880

(51) Int. Cl.
| | |
|---|---|
| *H04B 7/00* | (2006.01) |
| *H04W 4/80* | (2018.01) |
| *H04W 76/14* | (2018.01) |
| *B62J 1/08* | (2006.01) |
| *B62J 99/00* | (2009.01) |
| *B62M 6/55* | (2010.01) |
| *B62M 25/08* | (2006.01) |
| *B62K 23/06* | (2006.01) |
| *B62K 25/08* | (2006.01) |
| *B62M 6/90* | (2010.01) |

(52) U.S. Cl.
CPC ............... *H04W 4/80* (2018.02); *B62J 1/08* (2013.01); *B62J 99/00* (2013.01); *B62M 6/55* (2013.01); *B62M 25/08* (2013.01); *H04W 76/14* (2018.02); *B62J 2001/085* (2013.01); *B62J 2099/004* (2013.01); *B62J 2099/0013* (2013.01); *B62K 23/06* (2013.01); *B62K 25/08* (2013.01); *B62M 6/90* (2013.01)

(58) Field of Classification Search
CPC ............ H04W 4/80; H04W 76/14; B62J 1/08
See application file for complete search history.

(56) References Cited

U.S. PATENT DOCUMENTS

| | | | | |
|---|---|---|---|---|
| 7,614,971 | B2 * | 11/2009 | Fujii | B62M 25/045 474/70 |
| 8,909,424 | B2 | 12/2014 | Jordan et al. | |
| 9,491,788 | B1 * | 11/2016 | Kasai | G06K 7/1417 |
| 9,592,882 | B2 * | 3/2017 | Butora | B62K 25/10 |
| 2005/0272371 | A1 | 12/2005 | Komatsuzaki et al. | |

(Continued)

FOREIGN PATENT DOCUMENTS

| | | |
|---|---|---|
| JP | 2004-7351 A | 1/2004 |
| JP | 2006-13637 A | 1/2006 |

*Primary Examiner* — Md K Talukder
(74) *Attorney, Agent, or Firm* — Global IP Counselors, LLP

(57) ABSTRACT

A bicycle communication device includes a communicator and a memory. The communicator is communicable with a bicycle electric component and a bicycle operation unit. The bicycle electric component includes a drive unit. The memory stores information related to the bicycle operation unit. The communicator is configured to be able to input the information related to the bicycle operation unit to the bicycle electric component in a state where the communicator is located in a predetermined range that is within thirty centimeters from the bicycle electric component.

18 Claims, 6 Drawing Sheets

(56) References Cited

U.S. PATENT DOCUMENTS

| | | | |
|---|---|---|---|
| 2008/0114519 A1* | 5/2008 | DuFaux | B60T 7/16 701/70 |
| 2010/0103261 A1* | 4/2010 | Felt | B62J 99/00 348/148 |
| 2012/0221203 A1* | 8/2012 | Ichida | B62K 25/04 701/37 |
| 2013/0061705 A1* | 3/2013 | Jordan | B62M 25/08 74/473.13 |
| 2013/0144464 A1* | 6/2013 | Dorogusker | A63B 24/0062 701/1 |
| 2014/0102237 A1* | 4/2014 | Jordan | B62K 23/02 74/473.12 |
| 2014/0358387 A1* | 12/2014 | Cracco | B62M 9/122 701/51 |
| 2015/0009019 A1* | 1/2015 | Watarai | B62J 1/08 340/12.5 |
| 2015/0311953 A1* | 10/2015 | Kanamaru | G01C 22/002 455/41.1 |
| 2016/0152302 A1 | 6/2016 | Nishino | |
| 2016/0221627 A1* | 8/2016 | Hines | B62J 99/00 |
| 2016/0311499 A1* | 10/2016 | Kasai | B62M 25/08 |
| 2017/0158274 A1* | 6/2017 | Johnson | B62J 11/00 |
| 2017/0361894 A1* | 12/2017 | Gahlert | B62K 23/02 |
| 2018/0115860 A1* | 4/2018 | Masuda | H04W 76/14 |

* cited by examiner

BICYCLE COMMUNICATION DEVICE AND PAIRING METHOD

CROSS-REFERENCE TO RELATED APPLICATIONS

This application claims priority to Japanese Patent Application No. 2016-209880, filed on Oct. 26, 2016. The entire disclosure of Japanese Patent Application No. 2016-209880 is hereby incorporated herein by reference.

BACKGROUND

Field of the Invention

The present invention generally relates to a bicycle communication device and a pairing method.

Background Information

A known bicycle communication device performs pairing on a bicycle operation unit and a bicycle electric component. One example of such a bicycle communication device is disclosed in U.S. Pat. No. 8,909,424 (Patent Document 1).

SUMMARY

It is desirable that the usability for pairing a bicycle operation unit with a bicycle electric component be improved. It is an object of the present invention to provide a bicycle communication device and a pairing method that enhance the usability of pairing.

In a first aspect of the invention, a bicycle communication device includes a communicator and a memory. The communicator is communicable with a bicycle electric component and a bicycle operation unit. The bicycle electric component includes a drive unit. The memory stores information related to the bicycle operation unit. The communicator is configured to be able to input the information related to the bicycle operation unit to the bicycle electric component in a state where the communicator is located in a predetermined range that is within thirty centimeters from the bicycle electric component. The communicator is arranged in the predetermined range to allow pairing to be performed on the bicycle operation unit and the bicycle electric component. The pairing can be performed even in a case where the bicycle does not include an operation unit that performs the pairing. This enhances the usability of pairing. Additionally, since the predetermined range is within thirty centimeters, interference with radio waves of other devices is limited while the pairing is performed on the bicycle operation unit and the bicycle electric component.

In a second aspect of the invention, the bicycle communication device according to the first aspect further includes a base. The base includes the communicator and the memory. This modularizes the communicator and the memory.

In a third aspect of the invention, in the bicycle communication device according to any one of the preceding aspects, the base is configured to be attached to the bicycle operation unit and the bicycle electric component in a removable manner. The communicator is located in the predetermined range in a state where the base is attached to the bicycle electric component. The attachment of the base to the bicycle electric component allows the pairing to be performed on the bicycle operation unit and the bicycle electric component. This further enhances the usability of pairing.

In a fourth aspect of the invention, in the bicycle communication device according to any one of the preceding aspects, the bicycle operation unit includes a first card slot. The bicycle electric component includes a second card slot. The base is shaped as a card that is insertable into the first card slot and the second card slot. This facilitates the attachment of the base to the bicycle operation unit and the bicycle electric component.

In a fifth aspect of the invention, in the bicycle communication device according to any one of the preceding aspects, the base is configured to be attached to the bicycle operation unit in a removable manner. In a state where the base is in contact with the bicycle electric component or the base is not in contact with the bicycle electric component in the predetermined range, the communicator is located in the predetermined range. The pairing can be performed on the bicycle operation unit and the bicycle electric component without attaching the base to the bicycle electric component. This enhances the usability of pairing. Additionally, in a case where the base is brought into contact with the bicycle electric component to perform the pairing on the bicycle operation unit and the bicycle electric component, the interference with radio waves of other devices is further limited.

In a sixth aspect of the invention, in the bicycle communication device according to any one of the preceding aspects, the bicycle operation unit includes a first card slot. The base is shaped as a card that is insertable into the first card slot. This facilitates the attachment of the base to the bicycle operation unit.

In a seventh aspect of the invention, in the bicycle communication device according to any one of the preceding aspects, the communicator uses power that is generated by a radio wave from the bicycle electric component to input the information related to the bicycle operation unit to the bicycle electric component. Since the communicator does not need to include a power supply, the bicycle communication device is miniaturized. In a case where the communicator includes a power supply, the power consumption of the power supply in the communicator is reduced.

In an eighth aspect of the invention, in the bicycle communication device according to any one of the preceding aspects, the predetermined range is within five centimeters from the bicycle electric component. This further limits the interference with radio waves of other devices while the pairing is performed on the bicycle operation unit and the bicycle electric component.

In a ninth aspect of the invention, in the bicycle communication device according to any one of the preceding aspects, the information related to the bicycle operation unit includes identification information of the bicycle operation unit. Thus, the bicycle operation unit and the bicycle electric component are appropriately paired.

In a tenth aspect of the invention, in the bicycle communication device according to any one of the preceding aspects, the communicator and the memory are coupled to the bicycle operation unit. The communicator is located in the predetermined range in a state where the bicycle operation unit is arranged close to the bicycle electric component. The pairing can be performed on the bicycle operation unit and the bicycle electric component without attaching the base to the bicycle electric component. This enhances the usability of pairing.

In an eleventh aspect of the invention, a bicycle communication device includes a communicator and a memory. The communicator is communicable with a bicycle electric component and a bicycle operation unit. The bicycle electric component includes a drive unit. The memory stores information related to the bicycle operation unit. The communicator is arrangeable at a first position where the communicator is coupled to the bicycle operation unit and a second position where the communicator is located closer to the bicycle electric component than a state where the communicator is arranged at the first position. The communicator is configured to be able to input the information related to the bicycle operation unit to the bicycle electric component in a state where the communicator is arranged at the second position. The communicator is arranged at the second position to allow the pairing to be performed on the bicycle operation unit and the bicycle electric component. The pairing can be performed even in a case where the bicycle does not include an operation unit that performs the pairing. This enhances the usability of pairing. Additionally, the second position is located closer to the bicycle electric component than the first position. This limits interference with radio waves of other devices while the pairing is performed on the bicycle operation unit and the bicycle electric component.

In a twelfth aspect of the invention, in the bicycle communication device according to any one of the preceding aspects, the bicycle electric component includes at least one of a bicycle electric transmission, a bicycle electric suspension, a bicycle electric adjustable seatpost, and a bicycle assist driving unit. This allows the pairing to be easily performed on the bicycle operation unit and at least one of the above bicycle electric components.

In a thirteenth aspect of the invention, a method for pairing a bicycle operation unit with a bicycle electric component including a drive unit includes removing a bicycle communication device from the bicycle operation unit. The bicycle communication device includes a communicator and a memory. The communicator is communicable with the bicycle operation unit and the bicycle electric component. The memory stores information related to the bicycle operation unit. The method also includes arranging the communicator of the bicycle communication device in a predetermined range that is within thirty centimeters from the bicycle electric component to allow the communicator to input the information related to the bicycle operation unit to the bicycle electric component. The communicator is arranged in the predetermined range to allow the pairing to be performed on the bicycle operation unit and the bicycle electric component. The pairing can be performed even in a case where the bicycle does not include an operation unit that performs pairing. This enhances the usability of pairing. Additionally, since the predetermined range is within thirty centimeters, interference with radio waves of other devices is limited while the pairing is performed on the bicycle operation unit and the bicycle electric component.

The above bicycle communication device and pairing method enhance the usability of pairing.

BRIEF DESCRIPTION OF THE DRAWINGS

Referring now to the attached drawings which form a part of this original disclosure.

EMBODIMENTS OF THE INVENTION

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
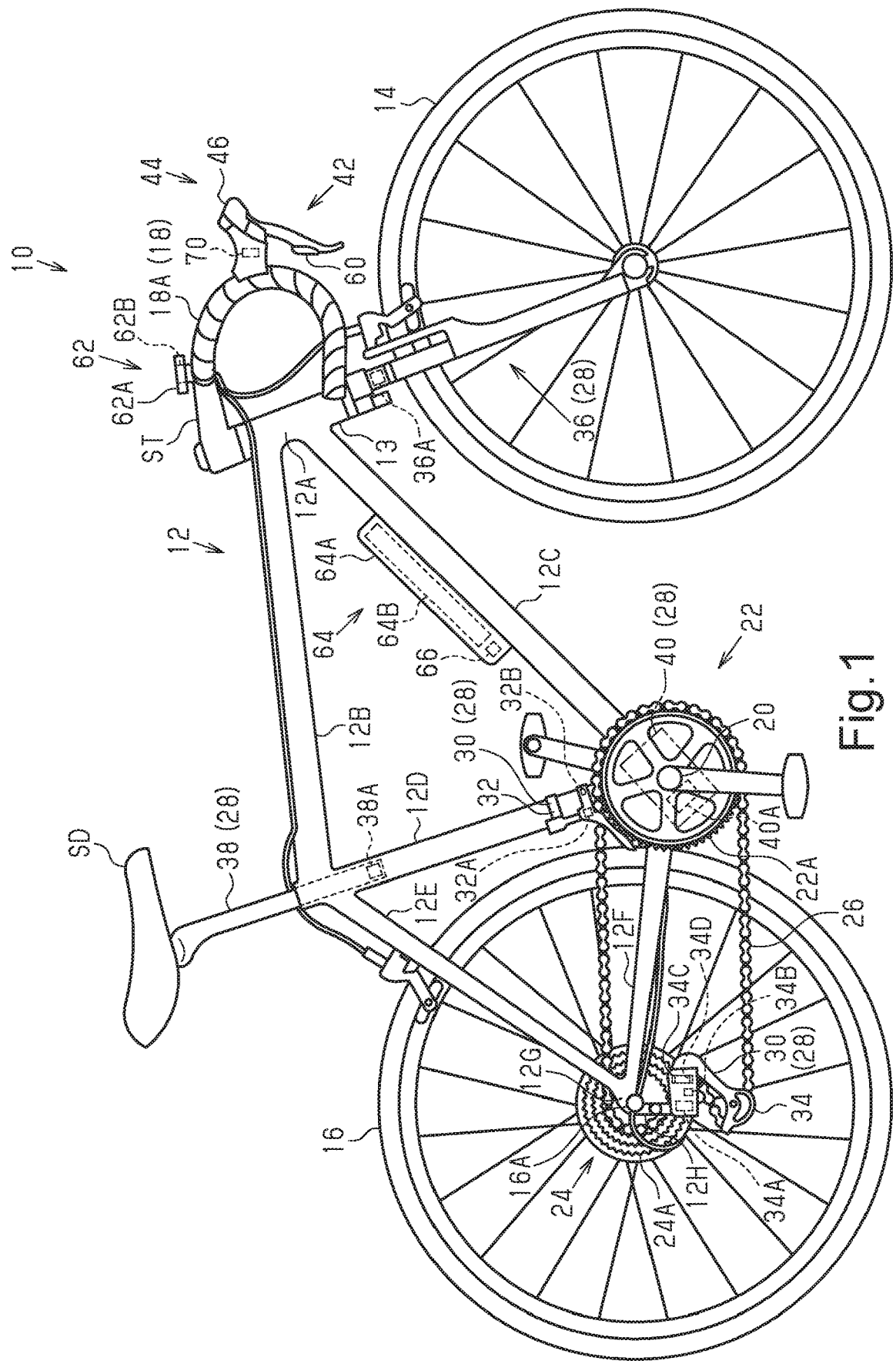
FIG. 1 is a side elevational view of a bicycle that includes a communication device in accordance with a first embodiment.

FIG. 1 shows a bicycle 10 that includes a bicycle communication device 70 (hereafter referred to as "the communication device 70"). As shown in the drawings, the bicycle 10 is, for example, of a road bike type. In one example, the bicycle 10 further includes a frame 12, a front fork 13, a front wheel 14, a rear wheel 16 and a handlebar 18. The frame 12 includes a head tube 12A, a top tube 12B, a down tube 12C, a seat tube 12D, a bottom bracket support portion (not shown), a seatstay 12E, a chainstay 12F, a rear end 12G and a derailleur hanger 12H. The handlebar 18 is coupled to the head tube 12A by a stem ST. The handlebar 18 includes a right handle 18A and a left handle (not shown).

The bicycle 10 further includes a crank 20, a front sprocket assembly 22, a rear sprocket assembly 24, a chain 26, a plurality of bicycle electric components 28 (hereafter referred to as "the electric components 28"), and a bicycle operation unit 42 (hereafter referred to as "the operation unit 42"). The crank 20 is coupled to a bottom bracket (not shown), which is supported by the bottom bracket support portion. The front sprocket assembly 22 includes one or more front sprockets 22A. The front sprocket assembly 22 is, for example, coupled to the crank 20 so as to integrally rotate with the crank 20. The rear sprocket assembly 24 includes one or more rear sprockets 24A. The rear sprocket assembly 24 is coupled to a hub assembly 16A of the rear wheel 16. The chain 26 runs around one of the front sprockets 22A of the front sprocket assembly 22 and one of the rear sprockets 24A of the rear sprocket assembly 24.

The electric components 28 include a bicycle electric transmission 30 (hereafter referred to as "the electric transmission 30"), a bicycle electric suspension 36 (hereafter referred to as "the electric suspension 36"), a bicycle electric adjustable seatpost 38 (hereafter referred to as "the electric ASP 38") and a bicycle assist driving unit (hereafter referred to as "the assist driving unit 40").

As seen in FIG. 1, the electric transmission 30 includes a front derailleur 32 and a rear derailleur 34. The front derailleur 32 is, for example, coupled to the seat tube 12D. The front derailleur 32 includes a drive unit 32A and a control unit 32B having at least one arithmetic processor. The control unit 32B controls the drive unit 32A to change the front sprocket 22A around which the chain 26 runs. The rear derailleur 34 is, for example, coupled to the derailleur hanger 12H. The rear derailleur 34 includes a drive unit 34A and a control unit 34B having at least one arithmetic processor. The control unit 34B controls the drive unit 34A to change the rear sprocket 24A around which the chain 26 runs.

The electric suspension 36 is, for example, coupled to the front fork 13. The electric suspension 36 includes a drive unit 36A. The drive unit 36A operates the electric suspension 36 to absorb an impact applied to the front wheel 14. The electric ASP 38 is supported, for example, by the seat tube 12D. The electric ASP 38 includes a drive unit 38A. The drive unit 38A operates the electric ASP 38 to change the height of a saddle SD relative to the seat tube 12D. The assist driving unit 40 is, for example, coupled to the frame 12. In one example, the assist driving unit 40 is coupled to the frame 12 in a vicinity of the bottom bracket support portion. The assist driving unit 40 includes a drive unit 40A. The drive unit 40A operates the assist driving unit 40 to assist in driving the rear wheel 16 of the bicycle 10.

The operation unit 42 includes a first operation unit 44 and a second operation unit (not shown). The first operation unit 44 is, for example, coupled to the right handle 18A. The first operation unit 44 includes a first brake lever 46 and a first shift operation portion 60. The first brake lever 46 is configured to apply the brakes on the rear wheel 16. The first shift operation portion 60 is, for example, coupled to the first brake lever 46. The first shift operation portion 60 is communicably connected to the rear derailleur 34. The connection mode is either a wireless communication or a wired communication. The first shift operation portion 60 is operated to drive the rear derailleur 34.

The second operation unit (not shown) is, for example, coupled to the left handle. The second operation unit includes a second brake lever and a second shift operation portion (not shown). The second brake lever is configured to apply the brakes on the front wheel 14. The second shift operation portion is, for example, coupled to the second brake lever. The second shift operation portion is communicably connected to the front derailleur 32. The connection mode is wireless communication or wired communication. The second shift operation portion is operated to drive the front derailleur 32. The second operation unit and the first operation unit 44 have substantially the same structure. Thus, the structure of the second operation unit will not be described in detail.

The bicycle 10 further includes a display unit 62. The display unit 62 is, for example, coupled to the handlebar 18. In one example, the display unit 62 is a cycle computer. The display unit 62 is communicably connected to, for example, each of the electric suspension 36, the electric ASP 38 and the assist driving unit 40. The connection mode is either a wireless communication or a wired communication.

The display unit 62 includes a display 62A and a control unit 62B having at least one arithmetic processor. In one example, the display 62A is a touchscreen display. The display 62A is configured to display various kinds of information related to the electric suspension 36, the electric ASP 38, and the assist driving unit 40. Additionally, the display 62A is configured to perform various kinds of operation related to the electric suspension 36, the electric ASP 38, and the assist driving unit 40. The operation unit 42 includes the display 62A. Based on operation performed on the display 62A, the control unit 62B controls the drive unit 36A of the electric suspension 36, the drive unit 38A of the electric ASP 38, and the drive unit 40A of the assist driving unit 40.

The bicycle 10 further includes a power supply unit 64 and a wireless communicator 66. The power supply unit 64 includes a battery holder 64A and a battery unit 64B. The battery holder 64A is, for example, coupled to the down tube 12C. The battery holder 64A is configured to hold the battery unit 64B. The battery unit 64B is configured to supply power, for example, to the electric components 28 and the display unit 62.

The wireless communicator 66 is arranged, for example, on the battery holder 64A. The wireless communicator 66 is a two-way wireless communicator that is configured to transmit and receive wireless signals. The wireless communicator 66 receives, for example, a wireless signal from each of the shift operation portions 60 and transmits the received signal to the corresponding one of the control units 32B and 34B. The wireless signals include a signal related to shifting up and a signal related to shifting down. The term "wireless communicator" as used herein includes a receiver, a transmitter, a transceiver, a transmitter-receiver, and contemplates any device or devices, separate or combined, capable of transmitting and/or receiving wireless communication signals. The wireless communication signals can be radio frequency (RF) signals, ultra-wide band communication signals, or Bluetooth communications or any other type of signal suitable for wireless communications as understood in the bicycle field. A one-way "wireless communicator" is configured to only either receive or transmit wireless communication signals. A two-way "wireless communicator" is configured to both receive and transmit wireless communication signals.

Figure 2:
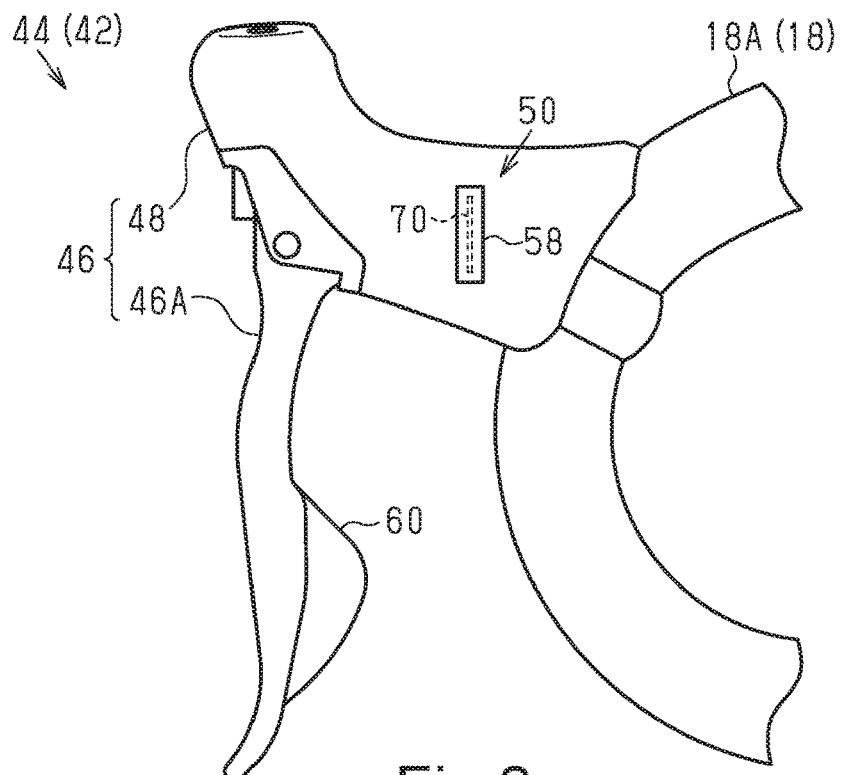
FIG. 2 is a side elevational view of a right handle of a handlebar and a first operation unit shown in FIG. 1.

As shown in FIG. 2, the first brake lever 46 includes a lever portion 46A and a lever support portion 48. The lever portion 46A is rotatably coupled to the lever support portion 48. In the illustrated example, the first shift operation portion 60 is arranged on the lever portion 46A. The lever support portion 48 is coupled, for example, to the right handle 18A to support the lever portion 46A. The lever support portion 48 includes an inner cavity 48A (refer to FIG. 3). The communication device 70 is accommodated, for example, in the inner cavity 48A.

Figure 3:
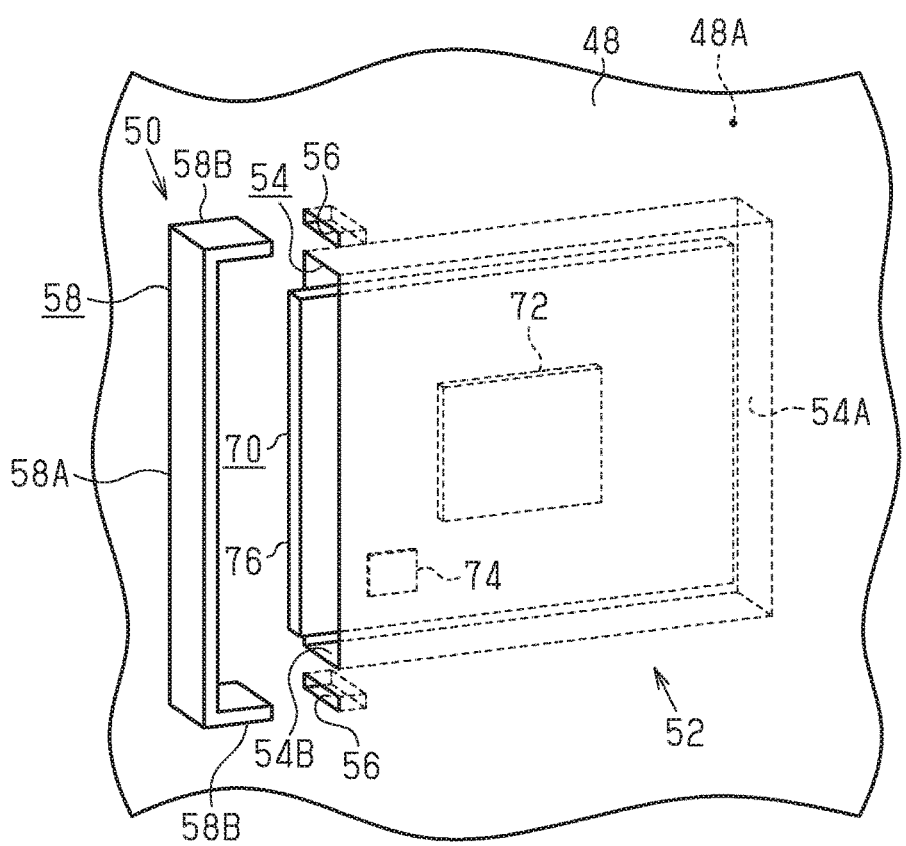
FIG. 3 is an exploded perspective view of a communication device and a first attachment structure shown in FIG. 2.

As shown in FIG. 3, the lever support portion 48 further includes a first attachment structure 50. The first attachment structure 50 is configured to accommodate the communication device 70 in the inner cavity 48A in a removable manner. The first attachment structure 50 includes an attachment portion 52 and a cover 58.

The attachment portion 52 is located, for example, on an inner surface of the lever support portion 48. The attachment portion 52 is configured to support the communication device 70 in a removable manner. The attachment portion 52 includes a recess 54 and a pair of attachment holes 56. The recess 54 includes a first card slot 54A. The pair of attachment holes 56 is located above and below an opening 54B defined by the recess 54. The cover 58 is attachable to the pair of attachment holes 56. The opening 54B is large enough to receive the communication device 70. The shape of the opening 54B is, for example, rectangular and is configured to define the longitudinal direction and the lateral direction.

The cover 58 includes a main portion 58A and a pair of insertion portions 58B. The main portion 58A extends in the longitudinal direction of the opening 54B. The pair of insertion portions 58B extends from longitudinally opposite ends of the main portion 58A toward the attachment holes 56. Insertion of the pair of insertion portions 58B into the pair of attachment holes 56 couples the cover 58 to the attachment portion 52. In the example shown in FIG. 1, the rear derailleur 34 further includes a second attachment structure 34C. The second attachment structure 34C has substantially the same configuration as the first attachment structure 50. The second attachment structure 34C includes, for example, a second card slot 34D (refer to FIG. 1).

The communication device 70 includes a communicator 72 and a memory 74 (i.e., a nonvolatile memory device). The communicator 72 is communicable with the corresponding one of the electric components 28 (refer to FIG. 1) and the operation unit 42 (refer to FIG. 2). The memory 74 stores information related to the operation unit 42.

Figure 4:
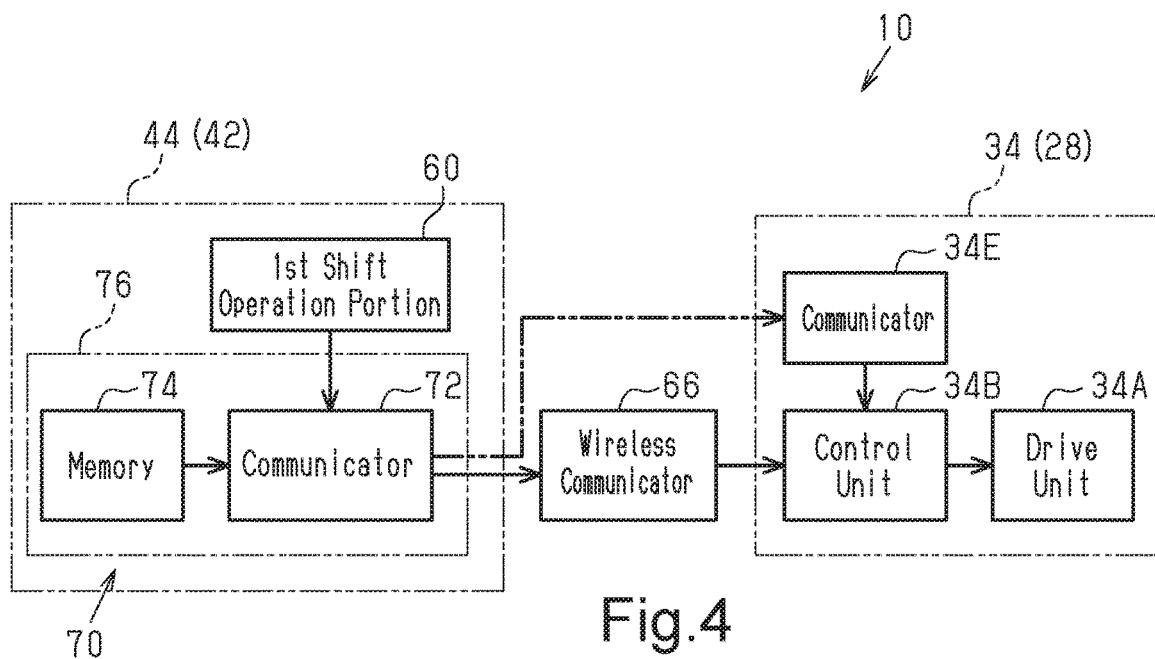
FIG. 4 is a block diagram showing the relationship in the electrical connection of the communication device shown in FIG. 1.

The communicator 72 is configured to be able to input information that is retrieved from the memory 74 and related to the operation unit 42 to the electric component 28, for example, in a state where the communicator 72 is located in a predetermined range that is within thirty centimeters from the electric component 28. Preferably, the predetermined range is within five centimeters from the electric component 28. The predetermined range refers to a distance from the communicator 72, for example, to a portion of the electric component 28 that is configured to receive the information from the communicator 72. Thus, the communicator 72 is a wireless communicator that wirelessly communicates with one of the electric components 28 (e.g., the rear derailleur 34 as seen in FIG. 4) to carry out a pairing operation.

The communicator 72 is arrangeable at a first position and a second position. The first position is where the communicator 72 is attached to the operation unit 42. The second position is where the communicator 72 is located closer to the electric component 28 than a state where the communicator 72 is arranged at the first position. In one example, the predetermined range includes the second position. The communicator 72 is configured to be able to input the information, which is retrieved from the memory 74 and related to the operation unit 42, to the electric component 28, for example, in a state where the communicator 72 is arranged at the second position.

The target of the electric components 28, to which the communicator 72 inputs the information related to the operation unit 42, includes at least one of the electric transmission 30, the electric suspension 36, the electric ASP 38 and the assist driving unit 40. The target electric component 28 is, for example, the rear derailleur 34. The memory 74 stores information related to the first operation unit 44. The information related to the first operation unit 44 includes, for example, identification information of the first operation unit 44.

The communication device 70 further includes a base 76. The communicator 72 and the memory 74 are arranged on the base 76. The base 76 is configured to be attached, for example, to the first operation unit 44 and the rear derailleur 34 in a removable manner. In the illustrated example, the base 76 is shaped as a card that is insertable into the first card slot 54A and the second card slot 34D (refer to FIG. 5). In a state where the communication device 70 is inserted into the first card slot 54A, and the cover 58 is attached to the attachment portion 52, the communication device 70 is accommodated in the inner cavity 48A of the lever support portion 48.

In a state where the base 76 is attached to the rear derailleur 34, the communicator 72 is located in the predetermined range. In one example, the communicator 72 is configured so that the information related to the first operation unit 44 is automatically inputted to the rear derailleur 34 by arranging the communicator 72 in the predetermined range. Thus, in a state where the communication device 70 is inserted into the second card slot 34D, the communicator 72 inputs the information related to the first operation unit 44 to the rear derailleur 34. Consequently, the first operation unit 44 is paired with the rear derailleur 34.

As shown in FIG. 4, the rear derailleur 34 further includes a communicator 34E. For example, in a state where the communicator 72 is located in the predetermined range, the communicator 34E receives information related to the first operation unit 44 from the communicator 72. The communicator 34E transmits the information, which is received from the communicator 72, to the control unit 34B. The control unit 34B reads the information related to the first operation unit 44. Consequently, the control unit 34B is associated with the first operation unit 44. In this manner, the communication device 70 performs pairing on the first operation unit 44 and the rear derailleur 34.

For example, after the pairing of the first operation unit 44 and the electric components 28 is completed, the communication device 70 is inserted and used in the first card slot 54A (refer to FIG. 3). In one example, the communication device 70 receives a wireless signal from the first shift operation portion 60 and transmits the wireless signal to the wireless communicator 66. Then, the wireless communicator 66 transmits the received signal to the control unit 34B of the rear derailleur 34. The control unit 34B controls the drive unit 34A based on the received signal.

Figure 5:
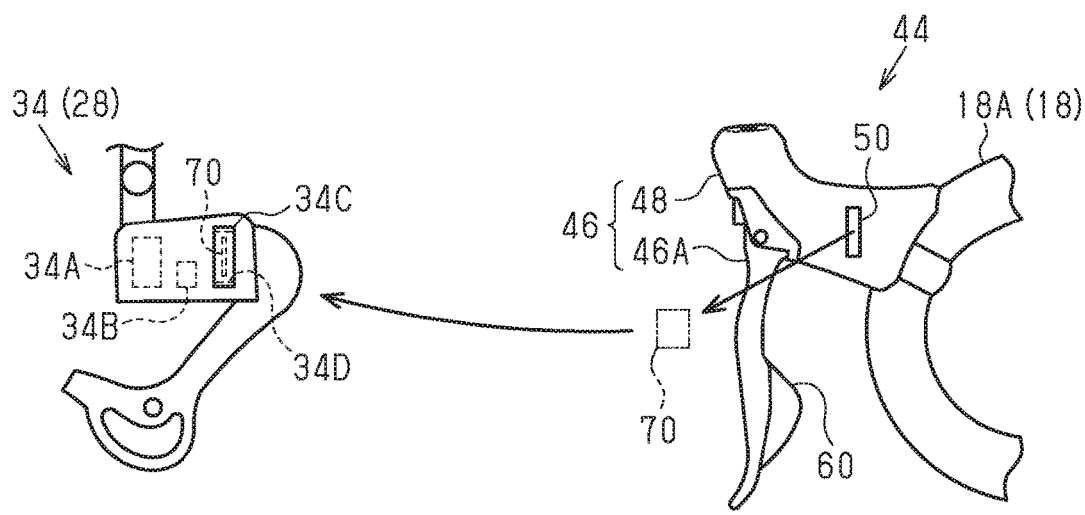
FIG. 5 is an operational diagram showing one example of a pairing method performed by the communication device of FIG. 1.

The procedures of the pairing performed by the communication device 70 will now be described with reference to FIG. 5. The communication device 70 performs the pairing of the first operation unit 44 and the rear derailleur 34, for example, through the following procedures. First, the communication device 70 is removed from the first operation unit 44. More specifically, the communication device 70 is removed from the first card slot 54A (refer to FIG. 3). The communicator 72 of the communication device 70 is arranged in the predetermined range to allow the communicator 72 (refer to FIG. 3) to input information related to the first operation unit 44 to the rear derailleur 34. More specifically, the communication device 70 is inserted into the second card slot 34D. The above procedures allow the communicator 72 to input the information related to the first operation unit 44 to the rear derailleur 34. Consequently, the first operation unit 44 is paired with the rear derailleur 34. Thus, operation of the first shift operation portion 60 is associated with operation of the rear derailleur 34.

Second Embodiment

A second embodiment of a communication device 80 differs from the first embodiment of the communication device 70 in the following points but otherwise has substantially the same structure as the first embodiment of the communication device 70.

Figure 6:
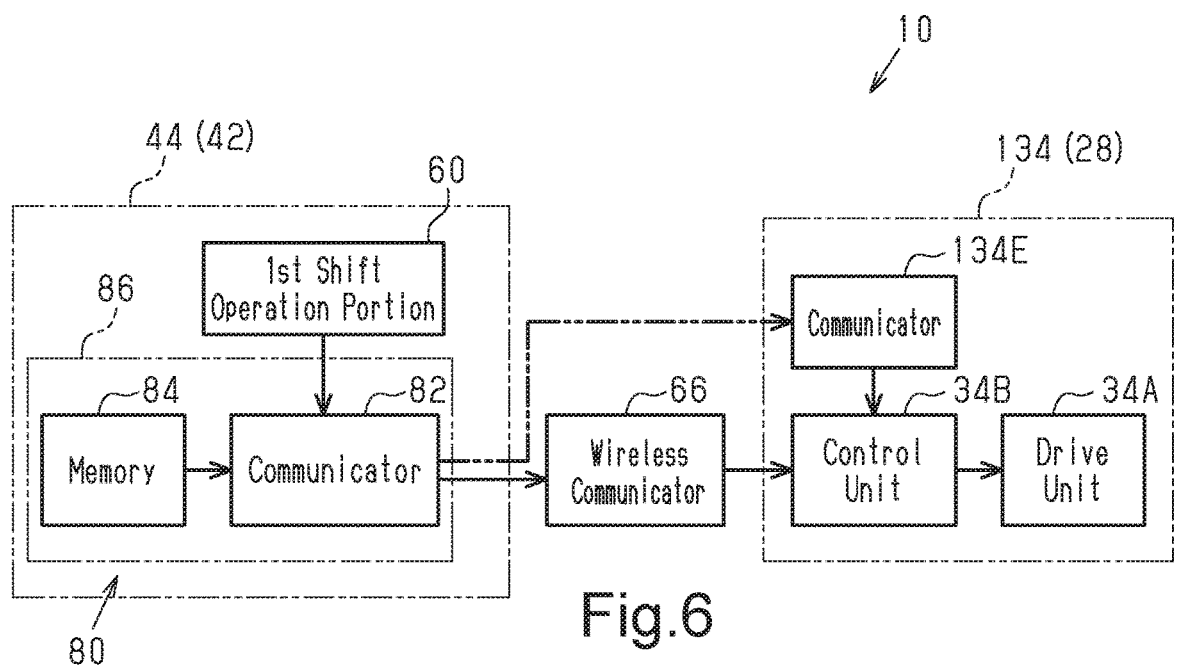
FIG. 6 is a block diagram showing the relationship in the electrical connection of a communication device in accordance with a second embodiment.

As shown in FIG. 6, the bicycle 10 includes the bicycle communication device 80 (hereafter referred to as "the communication device 80"). The communication device 80 includes a communicator 82 and a memory 84 (i.e., a nonvolatile memory device). The communicator 82 is communicable with the corresponding one of the electric components 28 and the operation unit 42. The memory 84 stores information related to the operation unit 42.

The communicator 82 is configured to be able to input information that is retrieved from the memory 84 and related to the operation unit 42 to the electric component 28 in a state where the communicator 82 is located in a predetermined range R1 (refer to FIG. 7) that is within thirty centimeters from the electric component 28. Preferably, the predetermined range R1 is within five centimeters from the electric component 28.

Figure 7:
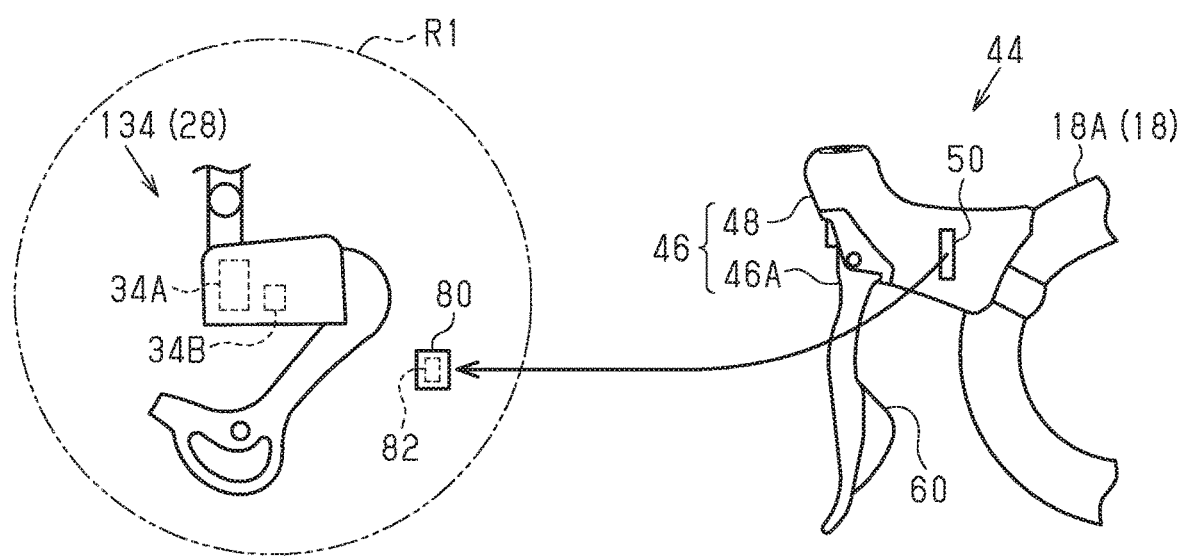
FIG. 7 is an operational diagram showing one example of a pairing method performed by the communication device of FIG. 6.

The communicator 82 is arrangeable at a first position and a second position. The first position is where the communicator 82 is attached to the operation unit 42. The second position is where the communicator 82 is located closer to the electric component 28 than a state where the communicator 82 is arranged at the first position. In one example, the predetermined range R1 includes the second position. The communicator 82 is configured to be able to input the information, which is retrieved from the memory 84 and related to the operation unit 42, to the electric component 28, for example, in a state where the communicator 82 is located at the second position. Thus, the communicator 82 is a wireless communicator that wirelessly communicates with one of the electric components 28 (e.g., the rear derailleur 134 as seen in FIG. 7) to carry out a pairing operation.

The target of the electric components 28, to which the communicator 82 inputs the information related to the operation unit 42, includes at least one of the electric transmission 30, the electric suspension 36, the electric ASP 38 and the assist driving unit 40. The target electric component 28 is, for example, a rear derailleur 134. The memory 84 stores information related to the first operation unit 44. The information related to the first operation unit 44 includes, for example, identification information of the first operation unit 44.

The communication device 80 further includes a base 86. The communicator 82 and the memory 84 are arranged on the base 86. The base 86 is configured to be attached, for example, to the first operation unit 44 in a removable manner. The base 86 is shaped as a card that is insertable into the first card slot 54A (refer to FIG. 3). The rear derailleur 134 of the second embodiment does not include the second attachment structure 34C.

In a state where the base 86 is in contact with the rear derailleur 134 or the base 86 is not in contact with the rear derailleur 134 but within the predetermined range R1, the communicator 82 is located in the predetermined range R1. In one example, the communicator 82 is configured so that the information related to the first operation unit 44 is automatically inputted to the rear derailleur 134 by arranging the communicator 82 in the predetermined range R1. The communicator 82 uses power, which is, for example, generated by a radio wave from the rear derailleur 134, to input the information related to the first operation unit 44 to the rear derailleur 134. The communicator 82 includes, for example, an integrated circuit (IC) tag, and preferably, a radio frequency (RF) tag.

The rear derailleur 134 includes the drive unit 34A, the control unit 34B and a communicator 134E. The communicator 134E outputs a radio wave that operates the communicator 82. The communicator 82 is configured to receive the radio wave from the communicator 134E in a state where the communicator 82 is located in the predetermined range R1. The communicator 82 uses power generated by the radio wave from the communicator 134E to transmit the information related to the first operation unit 44 to the communicator 134E of the rear derailleur 134. The communicator 134E transmits the information received from the communicator 82 to the control unit 34B. The control unit 34B reads the information related to the first operation unit 44. Consequently, the control unit 34B is associated with the first operation unit 44. In this manner, the communication device 80 performs pairing on the first operation unit 44 and the rear derailleur 134.

The procedures of the pairing performed by the communication device 80 will now be described with reference to FIG. 7. The communication device 80 performs the pairing of the first operation unit 44 and the rear derailleur 134, for example, through the following procedures. First, the communication device 80 is removed from the first operation unit 44. Then, the communicator 82 of the communication device 80 is arranged in the predetermined range R1 to allow the communicator 82 to input the information related to the first operation unit 44 to the rear derailleur 134. More specifically, the user moves the communication device 80 toward the rear derailleur 134 so that the communicator 82 is arranged in the predetermined range R1. The above procedures allow the communicator 82 to input the information related to the first operation unit 44 to the rear derailleur 134. Consequently, the first operation unit 44 is paired with the rear derailleur 134.

Third Embodiment

A third embodiment of a communication device 90 differs from the second embodiment of the communication device 80 in the following points but otherwise has substantially the same structure as the second embodiment of the communication device 80.

Figure 8:
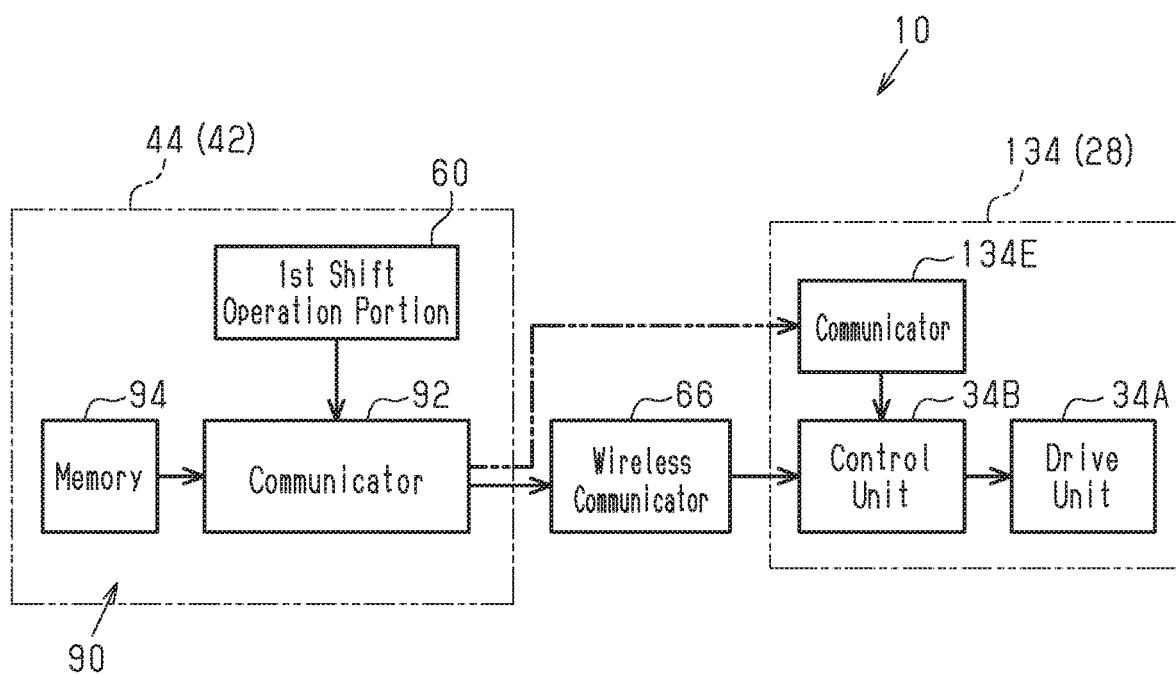
FIG. 8 is a block diagram showing the relationship in the electrical connection of a communication device in accordance with a third embodiment.

As shown in FIG. 8, the bicycle 10 includes the bicycle communication device 90 (hereafter referred to as "the communication device 90"). The communication device 90 includes a communicator 92 and a memory 94 (i.e., a nonvolatile memory device). The communicator 92 is communicable with the corresponding one of the electric components 28 and the operation unit 42. The memory 94 stores information related to the operation unit 42.

The communicator 92 is configured to be able to input information that is retrieved from the memory 94 and related to the operation unit 42 to the electric component 28, for example, in a state where the communicator 92 is located in a predetermined range R2 (refer to FIG. 9) that is within thirty centimeters from the electric component 28. Preferably, the predetermined range R2 is within five centimeters from the electric component 28.

The target of the electric components 28, to which the communicator 92 inputs the information related to the operation unit 42, includes at least one of the electric transmission 30, the electric suspension 36, the electric ASP 38, and the assist driving unit 40. The target electric component 28 is, for example, the rear derailleur 134. The memory 94 stores information related to the first operation unit 44. The information related to the first operation unit 44 includes, for example, identification information of the first operation unit 44. The communicator 92 and the memory 94 are coupled, for example, to the first operation unit 44. In one example, the communication device 90 is located in the first operation unit 44.

In a state where the first operation unit 44 is arranged close to the rear derailleur 134, the communicator 92 is located in the predetermined range R2. In one example, the communicator 92 is configured so that the information related to the first operation unit 44 is automatically inputted to the rear derailleur 134 by arranging the communicator 92 in the predetermined range R2. The communicator 82 uses power, which is, for example, generated by a radio wave from the rear derailleur 134, to input the information related to the first operation unit 44 to the rear derailleur 134. The communicator 92 includes, for example, an IC tag, and preferably, an RF tag.

The communicator 92 is configured to receive the radio wave from the communicator 134E in a state where the communicator 92 is located in the predetermined range R2. The communicator 92 uses power generated by the radio wave from the communicator 134E to transmit the information related to the first operation unit 44 to the communicator 134E of the rear derailleur 134. The communicator 134E transmits the information received from the communicator 92 to the control unit 34B. The control unit 34B reads the information related to the first operation unit 44. Consequently, the control unit 34B is associated with the first operation unit 44. In this manner, the communication device 90 performs pairing on the first operation unit 44 and the rear derailleur 134.

Figure 9:
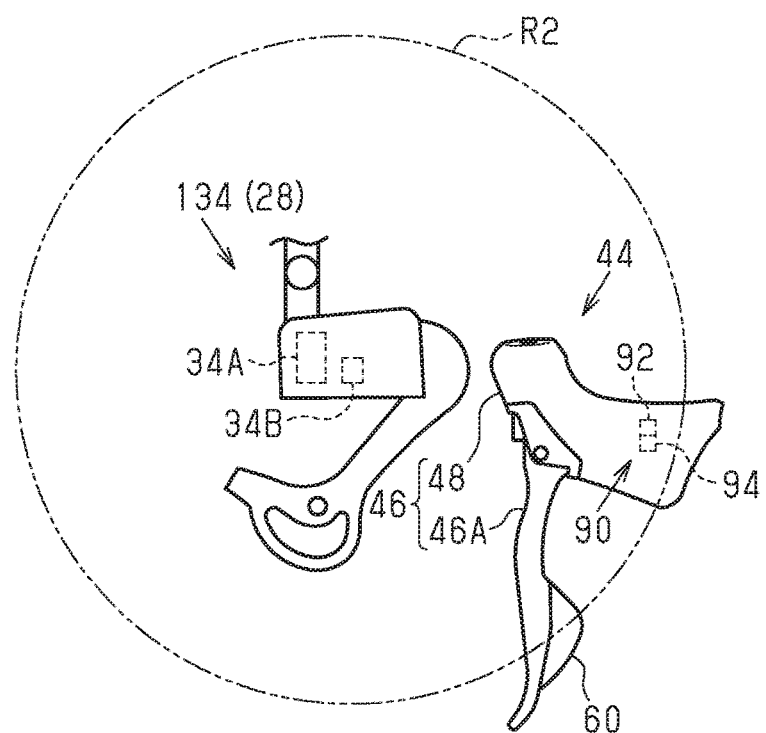
FIG. 9 is a schematic diagram showing one example of a pairing method performed by the communication device of FIG. 8.

The procedures of the pairing performed by the communication device 90 will now be described with reference to FIG. 9. The communication device 90 performs the pairing of the first operation unit 44 and the rear derailleur 134 through the following procedures, for example, before the first operation unit 44 is coupled to the right handle 18A (refer to FIG. 1). In one example, the communicator 92 of the communication device 90 is arranged in the predetermined range R2 to allow the communicator 92 to input the information related to the first operation unit 44 to the rear derailleur 134. More specifically, the user moves the first operation unit 44 toward the rear derailleur 134 so that the communicator 92 is arranged in the predetermined range R2. Thus, the communicator 92 is a wireless communicator that wirelessly communicates with one of the electric components 28 (e.g., the rear derailleur 134 as seen in FIG. 9) to carry out a pairing operation. The above procedures allow the communicator 92 to input the information related to the first operation unit 44 to the rear derailleur 134. Consequently, the first operation unit 44 is paired with the rear derailleur 134. After the pairing of the first operation unit 44 and the rear derailleur 134 is completed, the first operation unit 44 is coupled to the right handle 18A.

Modifications

The above description illustrates embodiments of a bicycle communication device and a pairing method according to the present invention and is not intended to be restrictive. In addition to the above embodiments, the present invention can include the following modifications. Further, two or more of the modifications can be combined.

In the second embodiment and the third embodiment, the predetermined ranges R1 and R2 can be changed. In a first modification, each of the predetermined ranges R1 and R2 is wider than five centimeters and narrower than thirty centimeters from the target electric component 28. In a second modification, each of the predetermined ranges R1 and R2 is wider than thirty centimeters from the target electric component 28.

In the third embodiment, the procedures of the pairing performed by the communication device 90 can be changed. In one example, before the rear derailleur 134 is coupled to the derailleur hanger 12H, the user moves the rear derailleur 134 toward the first operation unit 44 located on the right handle 18A so that the communicator 92 is arranged in the predetermined range R2. In this example, the rear derailleur 134 can incorporate a power supply that is configured to supply power for outputting radio waves. The power supply is, for example, a battery.

The information related to the operation unit 42 is automatically inputted to the target electric component 28. However, such a configuration can be changed. In a first example, the bicycle 10 includes a particular button. The particular button is operated to input the information related to the operation unit 42 to the target electric component 28. In a second example, each of the communication devices 70, 80 and 90 is moved in accordance with a particular pattern to input the information related to the operation unit 42 to the target electric component 28. The predetermined pattern is, for example, an infinity sign. In a third example, the bicycle 10 includes a button that allows for the selection between the automatic inputting mode in each embodiment and the mode in one of the first example and the second example.

The bases 76 and 86 are card-shaped. However, the shapes of the bases 76 and 86 can be changed. In a first modification, each of the bases 76 and 86 is a tube. In a second modification, each of the bases 76 and 86 is a polygonal rod.

Figure 10:
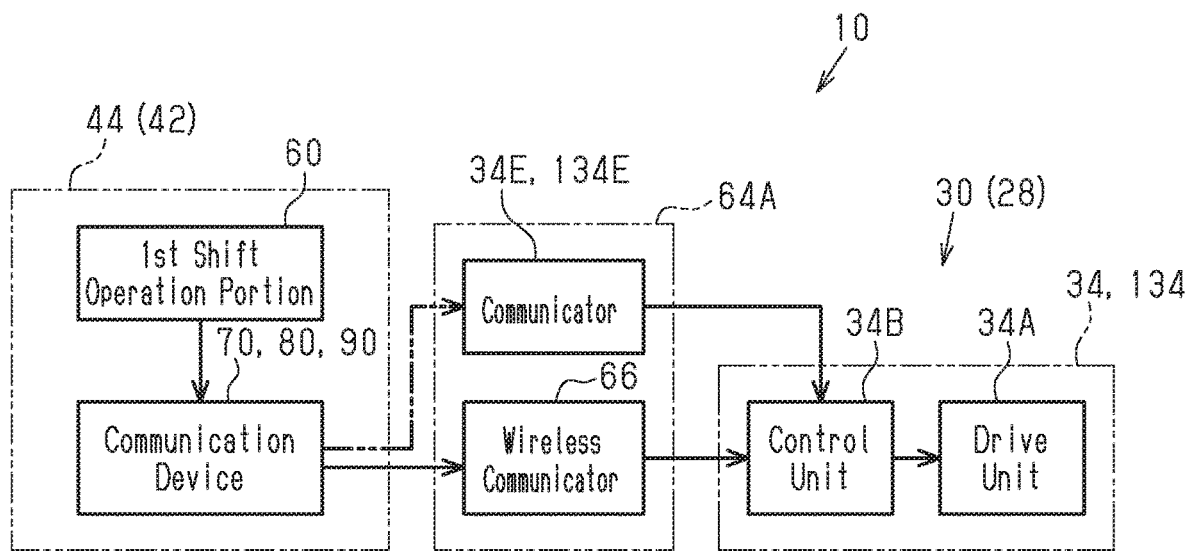
FIG. 10 is a block diagram showing the relationship in the electrical connection of a modification of a communication device.
Figure 11:
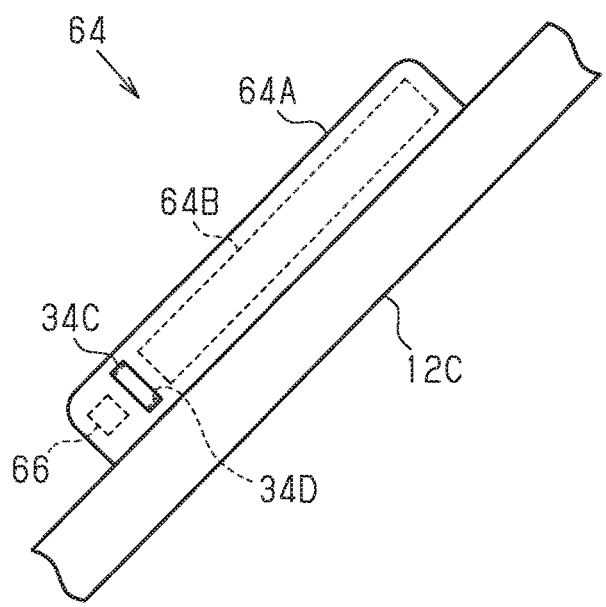
FIG. 11 is a side elevational view of a portion of a bicycle frame having a power supply unit in accordance with the modification of FIG. 11.

Each of the communicators 34E and 134E is located in one of the electric components 28. However, such a configuration can be changed. In one modification, as shown in FIG. 10, the communicators 34E and 134E are arranged in the battery holder 64A. In this example, as shown in FIG. 11, the battery holder 64A can include the second attachment structure 34C.

The wireless communicator 66 can be located at any position. In one example, the wireless communicator 66 is directly located in the target electric component 28. The target electric component 28 is any one of the front derailleur 32, the rear derailleurs 34, 134, the electric suspension 36, the electric ASP 38 and the assist driving unit 40. In this modification, the communicator 34E of the first embodiment and the communicator 134E of the second embodiment and the third embodiment can be integrated with the wireless communicator 66.

The information related to the first operation unit 44 can be transmitted to any component. In one example, the communicator 34E of the first embodiment can transmit information received from the communicator 72 to the wireless communicator 66. In this example, the wireless communicator 66 is associated with the first operation unit 44 by reading the information related to the first operation unit 44. Based on the information related to the first operation unit 44, the wireless communicator 66 determines a signal received from the first operation unit 44 among received signals and transmits the signal to the control unit 34B of the rear derailleur 34. More specifically, the communication device 70 substantially pairs the first operation unit 44 with the rear derailleur 34 by associating the first operation unit 44 with the wireless communicator 66. In the same manner, the communicator 134E of the second embodiment can transmit information received from the communicator 82 to the wireless communicator 66. More specifically, the communication device 80 substantially pairs the first operation unit 44 with the rear derailleur 134 by associating the first operation unit 44 with the wireless communicator 66. Also, the communicator 134E of the third embodiment can transmit information received from the communicator 92 to the wireless communicator 66. More specifically, the communication device 90 substantially pairs the first operation unit 44 with the rear derailleur 134 by associating the first operation unit 44 with the wireless communicator 66.

The target electric component 28 can be changed. In a first example, the target electric component 28 is the front derailleur 32. In the first modification, the memories 74, 84 and 94 store, for example, information related to the second operation unit. The communication devices 70, 80 and 90 pair the second operation unit with the front derailleur 32. In a modification example, the target electric component 28 is the electric suspension 36. In a modification example, the target electric component 28 is the electric ASP 38. In a fourth modification, the target electric component 28 is the assist driving unit 40. In the second to fourth modifications, the memories 74, 84 and 94 store information related to the display unit 62 and the display 62A or information related to another operation unit installed to the bicycle 10. Such an operation unit is located, for example, on the handlebar 18.

What is claimed is:

1. A bicycle communication device comprising:
   a communicator communicable with a bicycle electric component and a bicycle operation unit, the bicycle electric component including a drive unit;
   a memory that stores information related to the bicycle operation unit; and
   a base that includes the communicator and the memory, the base being configured to be selectively attached one at a time to the bicycle operation unit and the bicycle electric component in a removable manner,
   in a state where the communicator is located in a predetermined range that is within thirty centimeters from the bicycle electric component, the communicator automatically inputting the information related to the bicycle operation unit to the bicycle electric component so that the bicycle operation unit is paired with the bicycle electric component.

2. The bicycle communication device according to claim 1, wherein
   the communicator is located in the predetermined range in a state where the base is attached to the bicycle electric component.

3. The bicycle communication device according to claim 2, wherein
   the base is shaped as a card that is insertable into a first card slot of the bicycle operation unit and a second card slot of the bicycle electric component.

4. The bicycle communication device according to claim 1, wherein
   the base is configured to be removably attached to the bicycle operation unit in a removable manner, and
   in a state where the base is in contact with the bicycle electric component or where the base is not in contact with the bicycle electric component in the predetermined range, the communicator is located in the predetermined range.

5. The bicycle communication device according to claim 4, wherein
   the base is shaped as a card that is insertable into a first card slot of the bicycle operation unit.

6. The bicycle communication device according to claim 4, wherein
   the communicator is configured to use power that is generated by a radio wave from the bicycle electric component to input the information related to the bicycle operation unit to the bicycle electric component.

7. The bicycle communication device according to claim 1, wherein
   the predetermined range is within five centimeters from the bicycle electric component.

8. The bicycle communication device according to claim 1, wherein
   the information related to the bicycle operation unit includes identification information of the bicycle operation unit.

9. The bicycle communication device according to claim 1, wherein
   the communicator and the memory are coupled to the bicycle operation unit, and
   the communicator is located in the predetermined range in a state where the bicycle operation unit is arranged close to the bicycle electric component.

10. A bicycle communication device comprising: a communicator communicable with a bicycle electric component and a bicycle operation unit, the bicycle electric component including a drive unit; and a memory that stores information related to the bicycle operation unit, the communicator being arrangeable at a first position where the communicator is coupled to the bicycle operation unit and a second position where the communicator is located closer to the bicycle electric component than a state where the communicator is arranged at the first position, and in a state where the communicator is arranged at the second position, the communicator automatically inputting the information related to the bicycle operation unit to the bicycle electric component so that the bicycle operation unit is paired with the bicycle electric component.

11. The bicycle communication device according to claim 1, wherein
    the bicycle electric component includes at least one of a bicycle electric transmission, a bicycle electric suspension, a bicycle electric adjustable seatpost and a bicycle assist driving unit.

12. A bicycle component operating system comprising the bicycle communication device of claim 1, and further comprising:
    the bicycle electric component and the bicycle operation unit.

13. A bicycle component operating system comprising the bicycle communication device of claim 10, and further comprising: the bicycle electric component and the bicycle operation unit.

14. A method for pairing a bicycle operation unit with a bicycle electric component that includes a drive unit, the method comprising:
    removing a bicycle communication device from the bicycle operation unit, the bicycle communication device including a communicator and a memory, the communicator being communicable with the bicycle operation unit and the bicycle electric component, and the memory stores information related to the bicycle operation unit; and
    arranging the communicator of the bicycle communication device in a predetermined range that is within thirty centimeters from the bicycle electric component to allow the communicator to automatically input the information related to the bicycle operation unit to the bicycle electric component so that the bicycle operation unit is paired with the bicycle electric component.

15. A bicycle communication device comprising:
a communicator communicable with a bicycle electric component and a bicycle operation unit, the bicycle electric component including a drive unit;
a memory that stores information related to the bicycle operation unit; and
a base that includes the communicator and the memory, the base being configured to be selectively attached one at a time to the bicycle operation unit and the bicycle electric component in a removable manner,
the communicator automatically inputting the information related to the bicycle operation unit to the bicycle electric component in a state where the communicator is located in a predetermined range that is within thirty centimeters from the bicycle electric component,
the communicator being arrangeable at a first position where the communicator is coupled to the bicycle operation unit and a second position where the communicator is located closer to the bicycle electric component than a state where the communicator is arranged at the first position, the second position of the communicator being within the predetermined range.

16. The bicycle communication device according to claim 1, wherein
the information related to the bicycle operation unit includes identification information of the bicycle operation unit.

17. The method according to claim 14, wherein
the information related to the bicycle operation unit includes identification information of the bicycle operation unit.

18. The bicycle communication device according to claim 15, wherein
the information related to the bicycle operation unit includes identification information of the bicycle operation unit.

* * * * *